United States Patent [19]

Barrillon et al.

[11] Patent Number: 5,365,012
[45] Date of Patent: Nov. 15, 1994

[54] PROCESS FOR THE HEAT TREATMENT OF SPENT POT LININGS DERIVED FROM HALL-HEROULT ELECTROLYTIC CELLS

[75] Inventors: Eric Barrillon, Meylan; Pierre Personnet, Saint-Jean-de-Maurienne; Jean-Claude Bontron, Aix-en-Provence, all of France

[73] Assignee: Aluminium Pechiney, Courbevoie, France

[21] Appl. No.: 81,198

[22] Filed: Jun. 25, 1993

Related U.S. Application Data

[63] Continuation-in-part of Ser. No. 716,104, Jun. 17, 1991, Pat. No. 5,245,115.

[30] Foreign Application Priority Data

Jul. 4, 1990 [FR] France ............... 90 09174

[51] Int. Cl.⁵ ............... B09B 3/00; A62D 3/00; C01F 1/00
[52] U.S. Cl. ............... 588/248; 423/111; 423/659; 423/130; 588/900
[58] Field of Search ............... 588/248, 900; 423/DIG. 20, 111, 659, 130

[56] References Cited

U.S. PATENT DOCUMENTS 5,245,115  9/1993  Barrillon et al. ............... 588/248

Primary Examiner—Michael Lewis
Assistant Examiner—Wendy Lovern
Attorney, Agent, or Firm—Dennison, Meserole, Pollack & Scheiner

[57] ABSTRACT

A process for heat treating spent pot linings from Hall-Heroult electrolytic cells which comprise carbon and silico-aluminous materials impregnated with fluorides. The pot linings are ground to a particle size less than 5 mm, and formed into an intimate mixture with calcium sulfate or calcium sulfate dihydrate having a particle size less than 1 mm. The mixture is injected into the center of a vortex formed by a flow of circulating hot gas at the top part of a reactor at a temperature between 700° and 1100° C., and extracted from the bottom part of the reaction at a temperature between 400° and 750° C. after a contact time of less than 2 seconds.

13 Claims, 1 Drawing Sheet

PROCESS FOR THE HEAT TREATMENT OF SPENT POT LININGS DERIVED FROM HALL-HEROULT ELECTROLYTIC CELLS

This application is a continuation-in-part of U.S. application Ser. No. 07/716,104, filed Jun. 17, 1991, now U.S. Pat. No. 5,245,115.

BACKGROUND OF THE INVENTION

1. Field of the Invention

The invention relates to a process for the treatment in a reactor of spent pot linings derived, in particular, from the dismantling of cells for the production of aluminum by electrolysis according to the Hall-Heroult technique.

2. Description of Related Art

An aluminum production plant with a capacity of 240,000 metric tons per year produces approximately 4,000 metric tons per year of spent pot linings which are composed of carbon-containing cathodic blocks, seals, and lateral linings fabricated of carbon-containing paste, and also of all the refractories and insulators disposed on the lateral walls and the bottom of the metallic tank forming the electrolytic cell. After use, these products of the lining are strongly impregnated with noxious substances, such as soluble sodium fluorides, sodium aluminates, and cyanides, that must be insolubilized or destroyed before discharge or re-use.

Processes for treatment of old pot linings by a wet process, consisting of grinding followed by leaching in an alkaline solution, have already been described, for example in U.S. Pat. No. 4,052,288 (Aluminium Pechiney) or U.S. Pat. No. 4,113,631 (Kaiser).

These processes, which necessitate making use of expensive means, are limited solely to the treatment of carbon-containing parts of pot linings, which should be separated beforehand from the non-carbon-containing parts formed by the refractories and insulators.

Other known processes include treatment by a thermal process generally operating in a fluidized bed, and based either on pyrolysis of the spent pot linings at more than 1000° C., in accordance with U.S. Pat. No. 4,065,552 (Elkem) or U.S. Pat. No. 4,113,832 and U.S. Pat. No. 4,115,908 (Kaiser), or on simple combustion in the air or in an oxidizing atmosphere of carbon-containing elements at a temperature of approximately 800° C., which is sufficient to decompose the cyanides without provoking a major discharge of volatile fluorine-containing compounds, in accordance with U.S. Pat. No. 4,053,375 (Reynolds) or according to the article by L. C. Blayden and S. G. Epstein, Journal of Metals, Jul. 1984, page 24.

In fact, all the processes and devices using thermal process are limited in their possibilities by the nature and the composition of the linings to be treated. Indeed, because of the melting of certain eutectic compounds formed in the course of combustion, the pot lining particles have a strong tendency to agglomerate. It quickly becomes impossible to prevent the particle from agglomerating, and subsequently, to maintain a fluidized and dense bed if the combustion is achieved, for example, in a rotary kiln with a relatively long holding time. This phenomenon of agglomeration, already perceptible in the batches of pot linings constituted solely by carbon-containing products, is strongly accentuated in the batches containing refractory oxides, especially silica, of which the gravimetric content must not exceed 3 or 4%, as can be learned from the article by E. R. Cutshall and L. O. Daley, Journal of Metals, Nov. 1986, page 37, Table II.

The variant, consisting of achieving combustion in a reactor in a circulating fluidized bed of carbon-containing pot linings in a mixture with an additive composed of finely ground refractory oxides, in accordance with U.S. Pat. No. 4,763,585 (Ogden), limits the risks of superficial bonding followed by the agglomeration of the particles. In order to do this, the additive must remain inert during the combustion, that is to say neither reacting nor melting in contact with the carbon-containing wastes in a temperature range generally set on the order of 1000° C. However, here again, the problem of agglomeration is not resolved, except insofar as one treats the carbon-containing pot linings, or at least the pot linings derived from the linings with very low silica content, therefore essentially aluminum-based, whose life span is clearly inferior to that of modern linings in silico-aluminous preforms.

A process perfected by the present applicant and described in an earlier patent application (EP-A 0 485 388, corresponding to U.S. Ser. No. 07/716,104) permits treating all types of pot linings, especially those in which the gravimetric content of silica can reach 50%, without prior sorting and under conditions offering complete environmental safety, with total decomposition of cyanides, whose content in spent pot linings can reach 1%, and with substantially complete insolubilization of alkaline fluorides, which can represent up to 20% fluorine and 20% sodium by weight when the carbon content is generally between 20% and 40%.

This process comprises heating the spent pot linings abruptly, and for a very short time, at a temperature sufficient to permit the decomposition of cyanides, and preferably in the presence of an additive that is pulverulent and reactive, that is to say able to combine chemically with the fluorides impregnating the pot linings, in order to form stable, insoluble compounds such as $CaF_2$; the binary, ternary or quaternary compounds of NaF, $CaF_2$, CaO, $SiO_2$, $Al_2O_3$, $CaSO_4$, $Na_2SO_4$; and nepheline, hauynite, or other types of compounds. This abrupt heating for a very short time enables the avoidance of all combustion of the carbon-containing products, which also remain in the form of stable, insoluble compounds.

More precisely, the mixture of ground pot linings with the pulverulent additive, preferably kaolin, anhydrous or hydrous $CaSO_4$, CaO or a mixture thereof, is injected into the upper part of a reactor in a circulating gaseous flow at a temperature of between 1100° C. and 1800° C., and the time of contact between solid particles in the mixture and the circulating gaseous flow is regulated so that the particles reach a temperature of at least 750° C. before their extraction at the base of the reactor with the gaseous flow. In steady operation, the temperature of the gaseous flow, measured at a point in the reactor at a set value, is regulated by adjusting the gravimetric output of the pulverulent mixture injected at the top of the reactor. Exiting at the base of the reactor, the gaseous flow, after cooling, is separated from the solid particles constituting the stabilized residue, that is to say the residue in which the noxious compounds have been insolubilized or destroyed.

SUMMARY OF THE INVENTION

In the course of using this prior process on a commercial scale, the present applicant was confronted with two new difficulties which compromised the economic advantages of this thermal treatment:

1. The appearance, in steady operation, of an adherent deposit of expanding thickness of fine particles on the internal wall of the reactor once the temperature exceeds 1200° C., necessitating frequent stops for cleaning, incompatible with the operating conditions initially anticipated; and 2. The presence, in the gaseous cooling phase after the separation of the solid particles, of a certain quantity of HF, necessitating the addition of a costly and cumbersome device for trapping HF vapors, through a wet process, from the gaseous phase before release into the atmosphere.

Analysis of these two apparently unrelated problems has shown that, in reality, they both resulted from a single cause: a gaseous flow temperature that was excessively high in the upper part of the reactor, where the internal wall, even though cooled, can locally reach 1200° C. This high temperature causes bonding of the fine particles that are carried along with the gaseous flow, driven in a whirling movement, and remain in prolonged contact with the wall at more than 1100° C., and an onset of pyrohydrolysis of the alkaline fluorides to hydrofluoric acid by the water vapor arising from the residual humidity of the spent pot linings, the content of which can reach 2% by weight, depending on the duration and the storage conditions. This pyrohydrolytic reaction, which begins at 1100° C., can not only maintain itself but can amplify itself when the holding time of the particles in the gaseous flow is too long, and when the gaseous flow enters into contact, at more than 1000° C., with the moisture-saturated atmosphere produced by the water-filled holding tank placed under the reactor.

The solution, according to the invention involves, as a matter of priority, not acting directly on the temperature of the combustion gases at the level of the injector, but considerably increasing the gravimetric output of the pulverulent mixture feeding the injector, in order to lower the temperature of the circulating gaseous flow in the reaction chamber to less than 1100° C.

Against all expectation, and in spite of the major increase in the quantities of cyanides and fluorides consecutively introduced into the reactor at double the gravimetric output of the pulverulent mixture used in the basic process in accordance with U.S. Ser. No. 07/716,104, the excellent rates of pollution control recorded with the basic process have not only been retained but improved in the present process, when anhydrous $CaSO_4$ or $CaSO_4.2H_2O$ is used as the pulverulent additive.

More precisely, the invention relates to a process for the heat treatment, after grinding, of spent pot linings up to a particle size of less than 5 mm, and in the presence of a pulverulent additive with a particle size of less than 1 mm, where an intimate mixture is formed of the ground pot linings, composed of both carbon-containing products and silico-aluminous products impregnated with fluorine-containing mineral compounds, and the pulverulent mineral additive, essentially anhydrous $CaSO_4$ (anhydrite), $CaSO_4.2H_2O$ (gypsum) or a mixture thereof, capable of combining, when hot, in order to form new stable and insoluble compounds, characterized by the following steps:

The mixture is injected into the center of a vortex formed by the hot gas flow arriving tangentially at the upper part of a reactor and driven in a whirling movement, in such a quantity that the temperature T in the upper part of the reactor is between 700° C. and 1100° C.

The time of contact between the solid particles of the mixture and the circulating gaseous flow is regulated to less than 2 seconds, and in such a way that the particles, in suspension with a concentration contained between 0.1 and 3 $kg/Nm^3$, reach a temperature t of between 400° C. and 750° C. before their extraction from the base of the reactor with the gaseous flow.

The temperature of the gaseous flow, measured at the base of the reactor, is maintained at a set value $T_o$ such that $T>T_o>t$.

At the reactor outlet, after cooling, the solid particles constituting the stabilized residue are separated from the gaseous flow which is freed from dust before discharge into the atmosphere.

DETAILED DESCRIPTION OF THE INVENTION

The process according to the invention is based on the finding that it is possible to achieve destruction of the cyanides and insolubilization of the impregnated fluorine-containing compounds by chemical recombination, particularly with the additive, without agglomeration by abruptly placing the solid particles of the spent pot lining mixture in contact for a very short time, less than 2 seconds and preferably between 0.3 and one second, with a gaseous flow at a temperature T of between 700° C. and 1100° C. and preferably between 800° C. and 1000° C. The hot gaseous flow is the product of the combustion of a carburizing gas such as methane, butane or natural gas, in the presence of air, oxygen, or a mixture thereof. The thermal shock created thereby permits the decomposition of cyanides and the recombination of the fluorine-containing impregnants, substantially instantaneously while the temperature of the solid particles remains less than that of the gaseous flow, and therefore between 400° C. and 750° C., and preferably between 450° C. and 700° C. The possible softening of the solid particles by partial melting, in conjunction with the formation of meltable eutectic compounds, is not bothersome to the extent that all prolonged contact, and therefore all bonding between particles, is prevented by generating sufficient agitation in the reaction chamber. This agitation is achieved by regulating the speed of the gaseous flow to a sufficient value, at least 1 m/sec and preferably about 6 m/sec, at the respective treatment temperature.

In addition to the temperature T and the speed of the gaseous flow determined by regulating the flow of oxidizing and carburizing gases, it is also advisable to set the average holding time of the particles in the reaction chamber. The accepted range of 0.3 to 1 second is the best compromise for effective treatment of pot linings of very different compositions, within the maximum acceptable limits of contents ($Na \leq 20\%$ and $Si \leq 25\%$), necessitating a heating of the particles in the mixture at a temperature t, preferably of between 450° C. and 700° C., in order to insure sufficient kinetics to produce recombination reactions without risking either combustion of the particles of carbon-containing products or pronounced melting of the particles resulting in agglomeration. This holding time of the particles is a function not only of the speed of the circulating gaseous flow, but also of system engineering parameters, such as the dimensions of the reaction chamber, generally in conical or cylindro-conical form, as well as the path of the circulating gaseous flow, which is associated with the chosen mode of injection, and hence with the characteristics of the injector.

The adaptation of the characteristics of the mixture, in particular, its composition and its particle size, is also essential for the implementation of the process. Thus the spent pot linings are ground in order to obtain particles of a dimension of less than 5 mm, and preferably less than 3 mm. Furthermore, the pulverulent mineral additive, mixed with the ground pot linings in a proportion of less than 50% by weight in the final mixture, and capable of combining chemically with the products of impregnation, notably with the fluorides, in order to form stable and insoluble compounds, is anhydrous or hydrous $CaSO_4$, or a mixture thereof, that is, reactive materials that are relatively inexpensive and readily available. To increase the reactivity of the pulverulent additive, with a particle size of less than 1 mm, it is advisable to mix it intimately into the ground spent pot linings, and one variant in the preparation of the mixture can consist of introducing the additive into the coarsely ground pot linings and terminating the grinding of the mixture once the required particle size for the pot lining particles is achieved.

All these parameters having been examined and established through experimentation, it has proven to be possible, in making use of the invention, to control, continuously and with precision, the heat treatment of major quantities of spent pot linings, giving the process great reliability and great flexibility for functioning on an industrial scale. It is indeed possible, by means of the gaseous flow/solid matter exchange system, to stabilize reactor operating conditions between the entry and exit points of the reactor, in order to maintain a set value $T_o$ for the temperature of the gaseous flow, measured before its exit from the reaction chamber at the bottom of the reactor. To do so, it is sufficient to modify the gravimetric output of the pulverulent mixture injected into the reactor, or possibly the temperature of the gaseous flow in the upper part of the reactor, as a function of the temperature variations in relation to the control temperature $T_o$, in order to control the flow of combustible gas. These modes of continuous control and regulation of the heat treatment of spent pot linings are effective when used with a suitable reactor with injector, in particular the device made by VICARB that is used for implementing the process in its preferred version.

Finally, the gaseous flow, laden with solid particles, is extracted at the base of the reactor, where, after cooling, the gaseous flow is separated from the solid particles, forming an insoluble residue, while the dust-free gaseous flow is discharged directly into the atmosphere in the absence of any trace of fluorine-containing gas.

The effectiveness of the insolubilization treatment is monitored by taking samples of the residue and leaching in accordance with French standard X31-210. Quantitative analyses of $CN^-$ and $F^-$ are performed on the leaching juices; the cyanide and solubilized fluorine contents in proportion to the weight of the residue must remain less than 0.001% and 0.05%–0.3%, respectively, depending on the national standards currently in force.

BRIEF DESCRIPTION OF THE DRAWINGS

The process will be better understood from the description of its implementation in its preferred version, as shown in the flow chart of FIG. 1.

DESCRIPTION OF THE PREFERRED EMBODIMENTS

Figure 1:
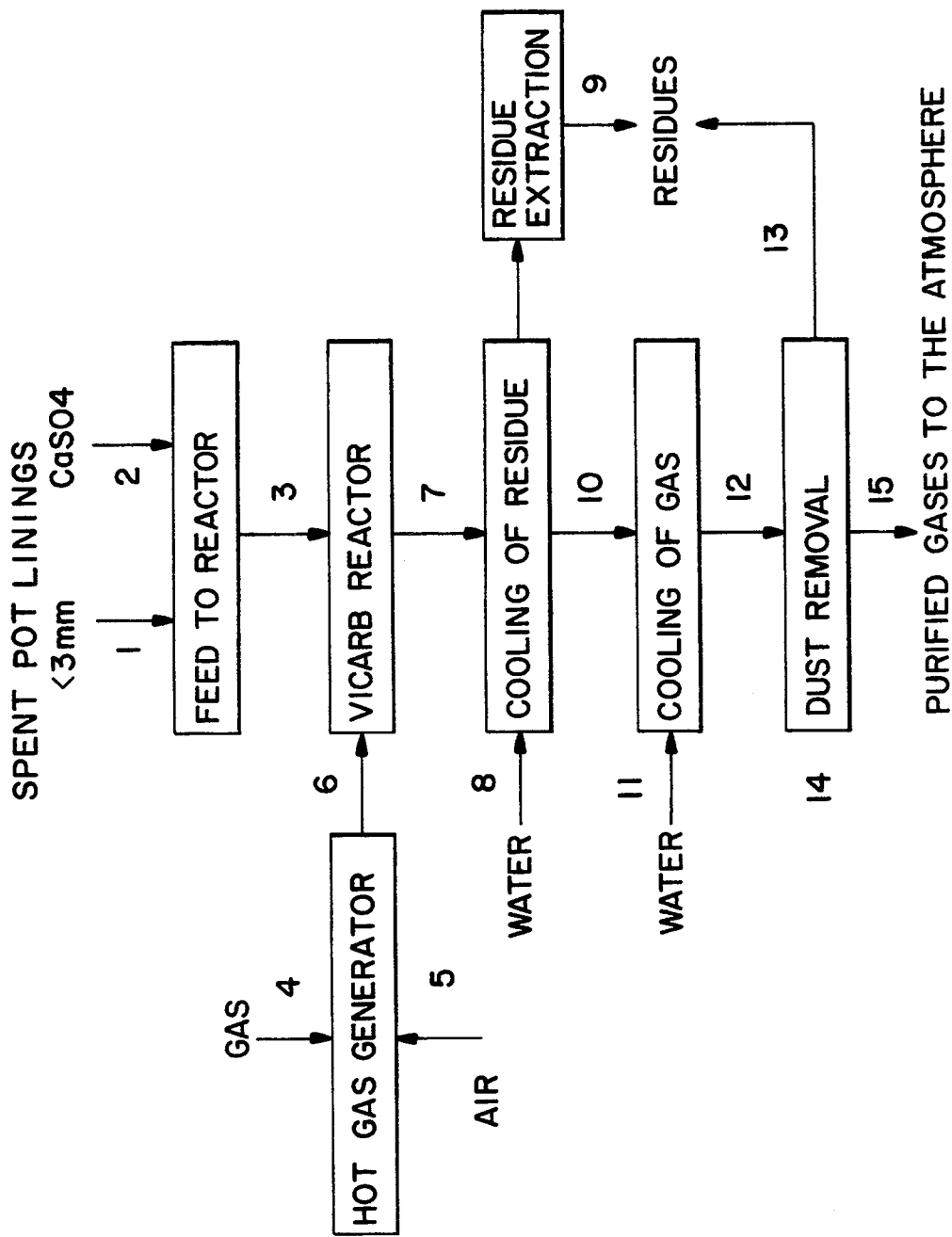

The pulverulent mixture, containing at least 50% by weight of spent pot linings 1 of a particle size of less than 3 mm, added to mineral additive 2, anhydrous or hydrous $CaSO_4$ or to a mixture thereof, is extracted from the base of a storage hopper by a transporter/metering screw with a variable rotation speed. The metering screw is connected 3 to the upper part of a VI-CARB-type cylindrical reactor equipped with a gas injector, as disclosed in EP 0 171 316, which serves as a generator of gaseous flow at a set temperature T, preferably between 800° C. and 1000° C., by initial control of the combustion of a carburizing gas mixture 4 and air 5 and completed by the adjustment of the output of pulverulent mixture, which in the present case can vary, by means of the controllable-speed screw, between 50 kg/hour and 600 kg/hour, in order to form a suspension with the gaseous flow, the concentration of which is between 0.2 and 3 $kg/Nm^3$, and preferably between 0.3 and 2 $Kg/Nm^3$ ($Nm^3$ = normal cubic meter; $m^3$ at 20° C. and 760 mm Hg).

The metered pulverulent mixture 3 is injected into the center of a vortex formed by the hot gas flow 5 arriving tangentially at the top of the cylindrical reaction chamber and driven in a whirling movement. In order to achieve a good dispersion of the particles of the mixture in the gaseous flow in the upper part of the reactor and good agitation, the speed of the flow is regulated at 6 m/second and taking into account the dimensions of the reaction chamber (1 meter in diameter and 3 meters in height), the corresponding average holding time is 0.5 seconds. At the temperature T set at the entrance of the reactor, generally between 800° C. and 1000° C., and for an average holding time on the order of 0.5 seconds for the solid particles, the gravimetric output of which can vary from 50 to 600 kg/hour, these solid particles reach a temperature of between 400° C. and 750° C., and preferably between 450° C. and 700° C., before departure from the reactor and cooling. Parallel monitoring of the temperature $T_o$ of the gaseous flow, measured in the same zone, shows that $T_o$ varies, like t, between 400° C. and 750° C., depending on the thermal range chosen and in conformity with the $T/T_o/t$ relationship. Once the value of $T_o$ is fixed, for example at 550° C., the differences in temperature $\Delta T$ in relation to this set value are corrected by adjusting the rate at which the pulverulent matter is injected by means of the feed screw with a variable rotation speed controlled by a device which measures and records the temperature variations to better than $\pm 5°$ C. in relation to the set temperature $T_o = 550°$ C.

In order to limit the risk of the particles bonding to the interior wall of the cylindrical reaction chamber, in which the temperature, in case of a breakdown in regulation, can locally exceed 1100° C., it can be advantageous to perform cooling of these walls, for example by sweeping air past the external wall.

The gaseous flow 7 at the exit point of the reactor is separated from the solid particles which are cooled and trapped, falling into a water-filled holding tank 8 placed under the reactor in a extension of the reaction chamber. After extraction from the tank, a first solid residue 9 is obtained. The gaseous flow 10 is channeled toward a device for cooling by vaporization of water 11, where it is cooled 12 to about 200° C. before entering a filter 14 to be cleaned of its dust 13, which constitutes a second solid residue. The gas is then discharged into the atmosphere 15 with HF and dust contents of less than 1 mg/Nm³ and 2 mg/Nm³, respectively.

The two solid residues, stemming from the double gas/solid separation combined with a double cooling, are mixed, and the final residue is subjected to analysis, that is, an inspection of the contents of CN⁻ and F⁻ from residue samples taken and leached according to the French standard X 31-210. This inspection indicates a rate of leachable residual cyanide systematically less than 0.0005% and a rate of leachable fluoride not exceeding 0.03%, which can be lowered, depending on the additive used in the mixture, to 0.015%.

the least restrictive national standards. Finally, in the presence of lime as an additive (mixture 2), contrary to what is observed with anhydrous or hydrous $CaSO_4$, the output of leachable F⁻ (0.20%) is not as good as that recorded at the lowest rate (0.17%) in the closest prior art.

TABLE 1

|  |  | EXAMPLES No. | | | |
| --- | --- | --- | --- | --- | --- |
|  |  | 1 | 2 | 3 | 4 |
| Initial total mixture, | Kg | 1,000 | 1,000 | 1,000 | 1,000 |
| comprising: | Kg | 600 | 600 | 1,000 | 600 |
| Old pot linings, |  |  |  |  |  |
| Additive: | Kg | 400 | 0 | 0 | 0 |
| anhydrous $CaSO_4$, |  |  |  |  |  |
| Lime, | Kg | 0 | 400 | 0 | 0 |
| Gypsum ($CaSO_4 \cdot 2H_2O$), | Kg | 0 | 0 | 0 | 400 |
| Heat Treatment |  |  |  |  |  |
| Mixture output, | Kg/h | 272 | 428 | 109 | 240 |
| Gas flow temperature, | C.° |  |  |  |  |
| high | T | 900 | 1,000 | 1,050 | 900 |
| low | $T_o$ | 550 | 550 | 620 | 510 |
| Gas flow speed, | m/s | 6 | 6 | 8 | 6 |
| Average holding time, | seconds | 0.5 | 0.5 | 0.35 | 0.5 |
| Rate of pollution abatement of residue |  |  |  |  |  |
| Total leachable CN⁻, | % | <0.0005 | <0.0005 | <0.01 | <0.0005 |
| Total leachable F⁻, | % | 0.015 | 0.20 | 1.55 | 0.03 |

EXAMPLES

The examples pertain to four compositions of homogeneous mixtures of 1000 Kg each, with a particle size of less than 1 mm, using spent pot linings with the following gravimetric contents:

| Na % = 14.0 | F % = 9.14 | C % = 29.2 |
| --- | --- | --- |
| Si % = 11.0 | CN % = 0.08 | |

These pot linings are mixed with following additives, with The exception of example 3 used as a reference:

| Example 1 | anhydrous $CaSO_4$ (anhydrite) |
| --- | --- |
| Example 2 | lime |
| Example 3 | no additive |
| Example 4 | $CaSO_4 \cdot 2H_2O$ (gypsum) |

The principal operating characteristics and the results of the pollution-control tests are indicated in Table 1 below.

It can be seen that, for the same compositions of the mixture as those disclosed by the closest prior art (EP-A-0465388 and U.S. Ser. No. 07/716104), a better rate of pollution control of the residue occurs with mixtures 1 and 4 using anhydrous $CaSO_4$, and $CaSO_4 \cdot 2H_2O$, respectively, as additives, even despite substantially doubling of the rates of feeding of the mixture and thus the quantities of impurities.

It should be noted that the thermal treatment of pot linings under the conditions of the invention but in the absence of an additive (example 3), leads to a rate of pollution control of the residue that is clearly insufficient, since the output of leachable F⁻ remains between 1.5 and 2%, that is to say at least five times more than

What is claimed is:

1. A process for heat treating spent pot linings obtained from Hall-Heroult electrolytic cells and comprising carbon and silico-aluminous materials impregnated with fluorides, comprising the steps of:
   grinding said spent pot linings to a particle size less than 5 mm;
   forming an intimate mixture of said ground spent pot linings and a pulverulent mineral additive of particle size less than 1 mm selected from the group consisting of anhydrous $CaSO_4$, $CaSO_4 \cdot 2H_2O$ and mixtures thereof;
   injecting said intimate mixture into the center of a vortex formed by a flow of circulating hot gas arriving tangentially at the top part of a reactor at a temperature T between 700° and 1100° C. and having a whirling movement;
   contacting said injected intimate mixture with said circulating hot gas to form a suspension of concentration between 0.1 and 3 kg/Nm³;
   extracting said suspension from a bottom part of the reactor at a temperature t between 400° and 750° C. after a contact time between said injected intimate mixture and said circulating hot gas of less than 2 seconds;
   maintaining the gas flow at the bottom of said reactor at a temperature $T_o$ between 450° and 700° C. and such that $T > T_o \geq t$;
   cooling said extracted suspension; and
   separating the gas flow of said cooled extracted suspension from solid particles of insoluble residue contained therein.

2. Process according to claim 1, wherein said fluorides are selected from the group consisting of NaF, $CaF_2$, $AlF_3$ and mixtures thereof.

3. Process according to claim 1, wherein in the spent pot linings, the maximum weight contents of fluoride, cyanide, silicon and sodium are respectively 20, 1, 25 and 20%.

4. Process according to claim 1, wherein the size of the spent pot linings particles, after grinding, is smaller than 2 mm.

5. Process according to claim 1 or 4, wherein the additive weight proportion in the mixture is less than 50%.

6. Process according to claim 1, wherein the temperature T of the gas flow formed by the fuel gases circulating in the upper part of the reactor is between 800° and 1000° C.

7. Process according to claim 1 or 6, wherein the gas flow at temperature T circulates at a speed of at least 1 m/sec.

8. Process according to claim 1, wherein the concentration of said pulverulent suspension is between 0.3 and 2 kg/Nm$^3$.

9. Process according to claim 1, wherein temperature $T_o$ is maintained by adjusting the weight flow rate of the intimate mixture injected into the gas flow at temperature T.

10. Process according to claim 9, wherein the intimate mixture weight flow rate is controlled by varying the speed of a feed screw injecting said mixture.

11. Process according to claim 1, wherein said hot gas is a product of combustion of a fuel gas.

12. Process according to claim 11, wherein temperature $T_o$ is maintained by controlled flow of a fuel gas conditioning the gas flow temperature.

13. Process according to claim 1, wherein said separated gas flow is subjected to an additional cooling and additional separation of solid particles therefrom.

* * * * *